Patented May 19, 1953

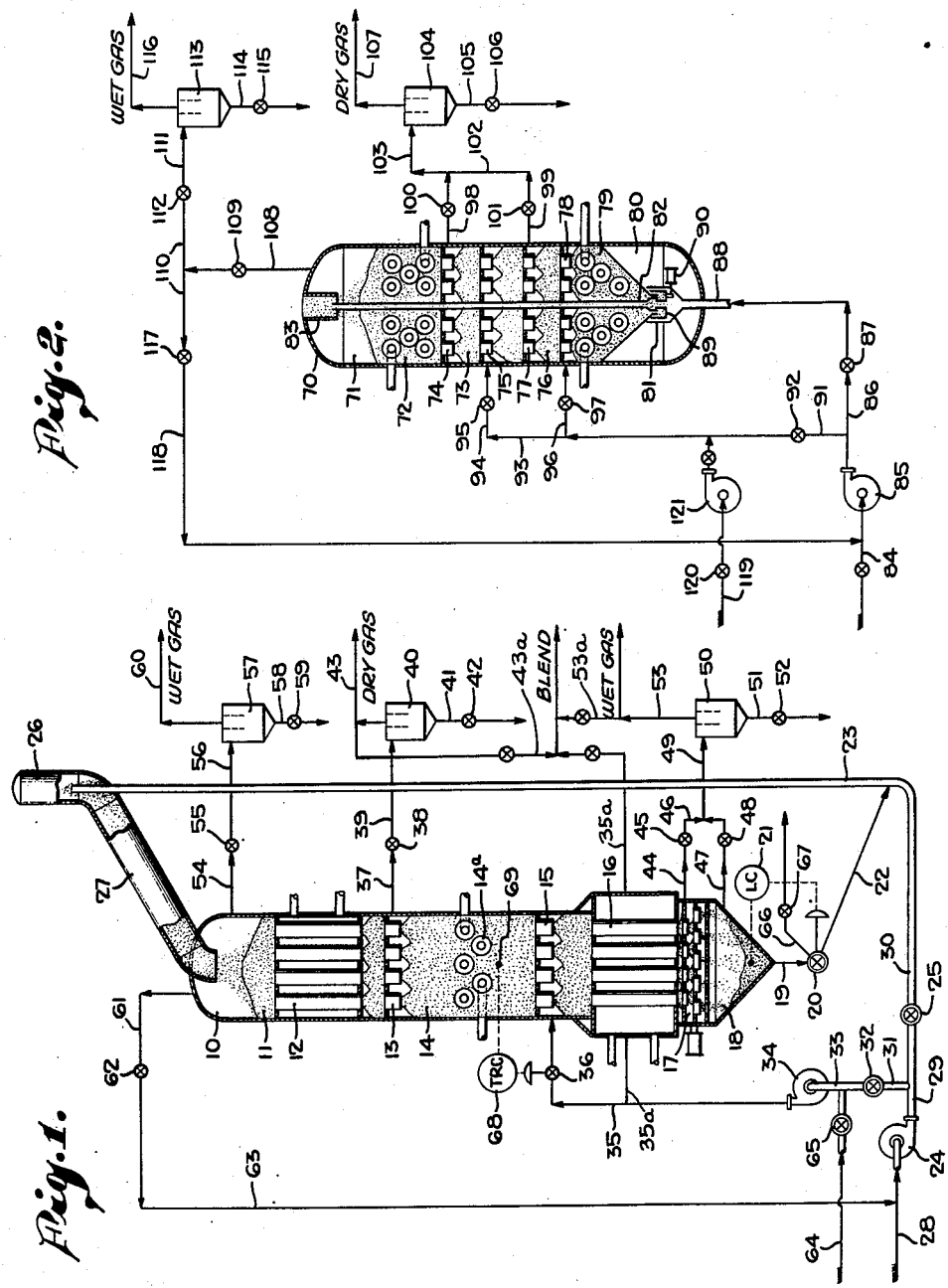

2,638,999

UNITED STATES PATENT OFFICE 2,638,999

ADSORPTION PROCESS

Clyde H. O. Berg, Long Beach, Calif., assignor to Union Oil Company of California, Los Angeles, Calif., a corporation of California Application December 13, 1947, Serial No. 791,640

21 Claims. (Cl. 183—4.2)

The present invention relates to the separation of gaseous mixtures by continuous selective adsorption on solid granular adsorbents and more particularly is concerned with the treatment of gaseous mixtures to separate the more readily adsorbable constituents from the less readily adsorbable constituents present. More specifically this invention relates to a method and apparatus for the dehydration of gases or gaseous mixtures such as the dehumidification of air in air conditioning operations by selective adsorption and may be applied to the dehydration of substantially any gaseous mixture. It is to the art of gas dehydration or dehumidification that this invention is particularly directed.

Gases containing water vapor are often encountered in industrial operations and in many such operations the presence of the moisture is detrimental or undesirable. The presence of water vapor in natural petroleum gases which are processed under elevated pressures and temperatures often causes the formation of hydrocarbon hydrates which are solids at these particular pressures and temperatures. Natural gas is often transported by pipe line under pressure over considerable distances and the formation of solid hydrocarbon hydrates presents a serious difficulty in the operation of high pressure natural gas pipe lines, pumps and control equipment. Dehydration of natural gas eliminates hydrate formation.

The dehydration of halogen gases, and chlorine in particular, is of considerable importance since in the presence of water vapor this material is highly corrosive. Dehydration of acid gases such as carbon dioxide, sulfur dioxide, sulfur trioxide, hydrogen chloride and other halogen acid gases which either react with or are corrosive in the presence of water vapor is highly desirable in many industrial operations.

Of particular importance is the dehydration and dehumidification of air as required in air conditioning operations which may be carried out in conjunction with industrial processes wherein certain materials must be handled and treated under controlled humidity conditions. For example, in the preparation of various fibers including pulp, news print and other types of paper, synthetic fiber including viscose, rayon, nitro-cellulose and cellulose acetate, natural silk, hides such as sheep skin, other materials including confections, tobacco, and preparation of electrical cable, the manufacture of cereals, certain operations involved in packing and printing and in many other industrial operations controlled humidity conditions are required. The dehumidification of air is further of importance in the maintenance of comfortable conditions in public and domestic buildings. There has been established a definite relationship between the air humidity and the air temperature in which individuals feel comfortable. In geographical areas wherein the temperatures and humidities are both high, air conditioning which involves dehumidification is a prime object in the attainment of comfortable air conditions. It is, therefore, primarily to the conditioning of air that the present invention is directed.

One object of the present invention is to provide a method and apparatus for the separation of gaseous mixtures which contain constituents of varying degrees of adsorbability into substantially pure fractions by selective adsorption.

Another object of this invention is to provide a method for the separation of such more readily adsorbable constituents as water vapor from gaseous mixtures containing water vapor by contacting such gaseous mixtures with a continuously moving bed of solid granular adsorbent.

It is a particular object of this invention to provide an improved method for the dehumidification of air by the continuous selective adsorption process to form a dehumidified air having the desired moisture content for either industrial or domestic use.

It is another object of this invention to provide an improved method for controlling air humidity by employing the principles of selective adsorption in a dehumidification process.

An additional object of this invention is to provide an apparatus adaptable to accomplish the above-mentioned objects.

Other objects and advantages of this invention will become apparent to those skilled in the art as the description thereof proceeds.

Briefly, the present invention comprises a process for the separation of gaseous mixtures by continuous selective adsorption on solid granular adsorbents and which is particularly adaptable to the separation of water vapor from moisture-containing gases. These separations are accomplished by contacting the gaseous mixture to be separated with a continuous moving bed of a solid granular adsorbent wherein the more readily adsorbable constituents of the gaseous mixture, in this case water vapor, are adsorbed leaving the less readily adsorbable constituents of the gaseous mixture as a substantially unadsorbed gas. The ability of the selective adsorption process to effect such separations as the separation of water vapor from less readily adsorbable constituents is based upon the fact that solid granular adsorbents exhibit a preferential adsorption. Certain gas molecules are adsorbed and held more strongly than other gases, the latter may be termed the less readily adsorbable constituents. By a continuous sequence of adsorption and desorption operations which are conducted continuously within a dense phase of solid granular adsorbent as a moving bed, a substantially complete and efficient separation of the gaseous mixture may be effected. In the case of the separation of moisture from humid air, a substantially complete dehydration may be effected, if desired, or by properly controlling the operating conditions such as the temperature and pressure and the ratio of adsorbent to feed gas to be dehydrated, a gas may be produced having any moisture concentration between that of the feed gas to be treated and a substantially completely dehydrated gas. A rich adsorbent containing the adsorbed moisture is formed with the dried air. The rich adsorbent is subsequently heated and contacted with a portion of the humid air feed as a stripping gas which desorbs the adsorbed moisture and leaves a lean adsorbent ready for reuse.

Dehumidified gases may be produced having dew points as low as about —100° F. or lower. When it is desirable to substantially completely dehydrate a given gaseous mixture such as air, natural gas or other moisture-containing gas, the ratio of pounds of adsorbent per MSCF (1 MSCF is equal to 1,000 standard cubic feet) of anhydrous gas is increased to a value higher than that required when a gas having a certain dew point or certain humidity is desirable. The continuous selective adsorption process as hereinafter more fully described offers a simple, efficient, and easily controlled method for regulating the moisture content of substantially any gaseous mixture and lends itself extremely well to dehumidification operations involved in air conditioning of domestic, public, and industrial buildings.

The process and apparatus of this invention may perhaps be more clearly understood by reference to the accompanying drawings in which:

Figure 1 represents a vertical cross section of a selective adsorption apparatus which is adapted to the dehumidification of large quantities of hydrous gases, and Figure 2 which shows a vertical cross section of a relatively small scale apparatus suitable, for example, to the dehumidification of air for domestic purposes.

Referring now more particularly to Figure 1, selective adsorption column 10 is provided with hopper 11, cooling zone 12, lean or dry gas disengaging zone 13, separation or adsorption zone 14, feed gas engaging zone 15, desorption zone 16, adsorbent flow control zone 17, and bottom zone 18. A continuous flow of a solid granular adsorbent is maintained from hopper 11 downwardly through the aforementioned zones which collects in bottom zone 18. The solid granular adsorbent collecting therein is removed by means of line 19 to flow through adsorbent flow control valve 20 which in turn is actuated by level control 21. A level control mechanism which is suitable for application is more completely disclosed, illustrated and claimed in co-pending application, Serial No. 775,554, filed September 22, 1947, now U. S. Patent No. 2,590,148. The level control mechanism 21 operating in conjunction with adsorbent flow controller 17 effects an accurate volumetric control over the flow rate of the adsorbent passing downwardly through selective adsorption column 10. The adsorbent passing through valve 20 is conveyed by means of transfer line 22 and is introduced into lift line 23 wherein a suspension of solid granular adsorbent is formed with a lift gas which may comprise a portion of the gaseous mixture to be separated or dehydrated. This lift gas-adsorbent suspension is conveyed under pressure exerted by blower 24 controlled by valve 25 upwardly through lift line 23 and is introduced into impactless separator 26. Herein the suspended adsorbent is separated from the lift gas and subsequently flows substantially independently of the lift gas downwardly through transfer line 27 to be introduced into the upper portion of selective adsorption column 10. The separated adsorbent settles as indicated in hopper 11 to subsequently flow downwardly through selective adsorption column 10 as described.

The impactless separator 26 is more clearly described, illustrated and claimed in co-pending application, Serial No. 618,345, filed September 24, 1945, now abandoned. The solids feeder present in solids feeder zone 17 is more clearly described, illustrated and claimed in co-pending application, Serial No. 618,347, also filed September 24, 1945, now U. S. Patent No. 2,544,214.

In order to facilitate a clear description of the apparatus illustrated in Figure 1, the gaseous mixture to be dehydrated will be assumed to be humid air and the solid granular adsorbent employed to effect the dehydration will be assumed to be activated charcoal.

Returning now to Figure 1, the humid air is introduced by means of line 28 into blower 24 and is passed at somewhat increased pressure into manifold 29. A portion of this air may be passed as previously described through line 30 controlled by valve 25 and employed as the lift gas to convey activated charcoal from the bottom to the top of the selective adsorption column. The remaining portion of the air is passed by means of line 31 controlled by valve 32 through line 33 into blower 34. Herein the pressure of the air is increased and the compressed air is passed by means of line 35 controlled by valve 36 into feed gas engaging zone 15. The major portion of the feed gas thus introduced into feed gas engaging zone 15, passes upwardly through adsorption zone 14 countercurrently to a downwardly moving bed of activated charcoal. Separation zone 14 may be advantageously provided with a plurality of adsorption zones when substantially complete gas dehydration is desired. Such a separation zone is more clearly described, illustrated, and claimed in co-pending application, Serial No. 730,166, filed February 21, 1947, now U. S. Patent No. 2,550,955. An intimate contact of the humid air to be dehydrated is thus obtained and the water vapor present is substantially completely adsorbed to form a rich charcoal leaving air substantially unadsorbed and dehumidified. The dehumidified air passes upwardly to disengaging zone 13 and a portion is removed therefrom by means of line 37 controlled by valve 38. The dehumidified air thus removed is passed by means of line 39 into separator 40 wherein traces of suspended charcoal are removed. The charcoal fines thus separated are removed from separator 40 by means of line 41 controlled by valve 42. The dehumidified air, substantially free of suspended charcoal is removed from separator 40 by means of line 43 and is sent to fulfill requirements for which it was prepared.

The rich charcoal containing adsorbed water vapor and heated slightly due to the heat of adsorption liberated passes downwardly through adsorption zone 14 over finned-tube coils 14a through which a cooling medium may be circulated if desired. The heat of adsorption may thus be dissipated, lowering the rich charcoal temperature, and increasing its adsorption capacity. The cooled rich charcoal passes through feed gas engaging zone 15 into desorption zone 16 wherein the rich charcoal is subjected to indirect heating which increases the partial pressure in equilibrium with the rich charcoal. Operation of the selective adsorption apparatus is such that the remaining portion of feed gas introduced into feed gas engaging zone 15, which portion does not pass upwardly through adsorption zone 14, passes downwardly through desorption zone 16 so as to continuously remove water vapor desorbed from the rich charcoal. Such a downward flow of air is effected by maintaining a pressure in bottom zone 18 which is slightly less than the pressure of the feed gas introduced into feed gas engaging zone 15. By controlling valve 38 the pressure of the gas present at lean gas disengaging zone 13 may be made sufficient to cause the major proportion of the feed gas introduced to flow upwardly through adsorption zone 14 while allowing a minor portion, which is sufficient to effect water vapor desorption, to flow downwardly through desorption zone 16.

The water vapor desorbed from the rich charcoal in desorption zone 16 passes downwardly into adsorbent feeder zone 17 as a rich or wet gas. If desirable, this wet gas may be removed by means of line 44 controlled by valve 45 and may be introduced into manifold 46. Removal of the rich gas through line 44 has the advantage that it prevents a downward flow of gas through adsorbent feeder zone 17 which may in extreme cases alter the flow characteristics of granular solids through the tubes. Ordinarily this effect under these conditions is not pronounced and the rich gas may also be removed from bottom zone 18 by means of line 47 controlled by valve 48. In any event, the rich gas thus produced is introduced by means of line 49 into separator 50 wherein suspended fine particles of charcoal are separated. These particles are subsequently removed from separator 50 by means of line 51 controlled by valve 52. The rich gas or wet gas, substantially free of suspended charcoal fines, is removed from separator 50 through line 53 and is sent to storage or further processed or vented to the atmosphere by means not shown.

The charcoal collecting in bottom zone 18 contains small quantities of adsorbed moisture and may be termed a partially stripped charcoal. By the means previously described, this charcoal is removed from bottom zone 18 and is introduced into the upper portion of selective adsorption column 10 to flow downwardly through cooling zone 12. As previously described, only a portion of the lean gas or dehumidified air is removed from disengaging zone 13 and the remaining portion passes upwardly countercurrent to the downwardly flowing charcoal through cooling zone 12. This flow of dehumidified air causes the desorption of the remaining portion of adsorbed moisture and a lean charcoal results. During the passage of the charcoal through cooling zone 12 indirect cooling is effected by circulating cold water or other cooling medium on the outside of the tubes. The cooled lean charcoal subsequently passes into adsorption zone 14 to contact and dehumidify further quantities of humid air.

The moisture desorbed from the partially stripped charcoal passing through cooling zone 12 passes as a vapor into the upper portion of selective adsorption column 10 wherefrom it may be removed together with the lift gas by means of line 54 controlled by valve 55 and passed by means of line 56 into separator 57. Separator 57 effects the removal of suspended particles of charcoal from the gas stream, which particles are removed from separator 57 by means of line 58 controlled by valve 59. The wet gas is removed from separator 57 substantially free of suspended charcoal by means of line 60.

This gas comprises a wet gas or humid air but which contains considerably less moisture than the wet gas removed from separator 50. If desired, these two wet gas streams may be combined and vented to the atmosphere or sent to further processing or storage, not shown.

In large installations it is nearly always desirable to reprocess the wet gas above described as being removed by means of line 60 in which case valve 55 is at least partially closed and the stripped gas together with the lift gas is removed from the upper portion of selective adsorption column 10 by means of line 61 controlled by valve 62 and is conveyed by means of line 63 back to blower 24 wherein it is combined with the humid air or other gaseous mixture to be dehydrated.

In some instances, not always connected with the dehumidification of air, it is desirable to maintain the lift gas circulating in a manner which is substantially completely independent of the feed gas to be dehumidified. In such a case valve 32 is closed and the feed gas to be dehumidified is introduced by means of line 64 controlled by valve 65 directly into manifold 33 and the air is blown by means of blower 34 through line 35 for introduction into feed gas engaging zone 15. In this manner the recirculation of a lift gas to maintain the charcoal circulation is employed which is substantially independent of the other gas streams involved in the process. However, a small amount of lift gas passes upwardly through transfer line 22 countercurrent to the downwardly flowing charcoal and a small amount of wet gas passes downwardly from bottom zone 18 through sealing leg 19 concurrently with the downwardly flowing charcoal. In order to prevent contamination of the lift gas or of the wet gas, bleed line 66 controlled by valve 67 is employed to remove a seal gas from charcoal flow control valve 20 thus effectively sealing the bottom portion of the selective adsorption column against contamination and against loss of wet gas.

The control of the process may be effected by employing temperature recorder controller 68 which serves to actuate control valve 36 to vary the quantity of feed gas introduced into a selective adsorption column 10. With air and water vapor mixtures, the water vapor is the more readily adsorbable constituent and is adsorbed in adsorption zone 14 with the liberation of heat. The heat of adsorption causes the temperature of the adsorbent to rise and leads to the formation of a temperature break or a sharp temperature gradient within the adsorbent in that zone. The positioning of thermocouple point 69 or other suitable temperature sensitive means in contact with the charcoal in adsorption zone 14 permits temperature recorder controller 68 to be used to actuate control valve 36 in accordance with the position of the temperature break in the adsorption zone. For a constant flow of charcoal, an increased feed gas flow will cause the temperature break to rise within the adsorption zone and a decreased flow of feed gas will have the reverse effect. The employment of temperature control means as just described to vary the flow rate of feed gas introduced into the selective adsorption column results in the efficient separation of gaseous mixtures and specifically in the dehumidification of gases to the production of gases in a substantially anhydrous condition or in a condition of any desired humidity.

Referring now more particularly to Figure 2, a vertical cross section of a modified selective adsorption apparatus is shown which is adapted to a small scale dehydration of gases and which will accomplish the same separations as the apparatus described and illustrated in Figure 1. An apparatus such as that shown in Figure 2 is more readily adaptable to domestic dehumidification operations and to the air conditioning of small buildings. Such an apparatus is further suitable for the dehydration of other gases in small quantities. The characteristic feature of this apparatus which differentiates it from the apparatus of Figure 1 is the fact that an external lift line is not employed and that the charcoal or other adsorbent is conveyed from the bottom of the vessel to the top of the vessel by means of a conduit positioned within the vessel itself. Such a design readily lends itself to the simplified construction desirable in small installations.

Selective adsorption column 70 is provided with hopper 71, cooling zone 72 and a separation zone which employs a modification somewhat different from that shown in Figure 1. Dual inlets and outlets are shown so that in effect there are two adsorption zones present in the separation zone. As shown in Figure 2 these two adsorption zones function as one separation zone and are in effect connected in parallel so that each handles about one-half of the quantity of feed gas to be separated. Multiple adsorption zones may be employed wherein the rich charcoal formed in one is conveyed independently of the other to the desorption zone. Such modifications are described, illustrated and claimed in copending application, Serial No. 730,166, filed February 21, 1947, now U. S. Patent No. 2,550,955. The primary adsorption zone 73 is provided with primary lean gas disengaging zone 74 and primary engaging zone 75. Secondary adsorption zone 76 is provided with secondary lean gas disengaging zone 77 and secondary feed gas engaging zone 78. The adsorption zone may also be provided with means for cooling the charcoal in situ to dissipate the heat of adsorption. Such means in the form of coiled finned tubes are shown in the adsorption zone of Figure 1. Selective adsorption column 70 is further provided with desorption zone 79 and bottom zone 80 which latter zone contains a modified charcoal control valve adapted to form a lift gas charcoal suspension to convey the charcoal from the bottom to the top of the adsorption column. The charcoal flowing downwardly from hopper 71 passes successively through the aforementioned zones to contact the incoming gas and adsorb a controlled quantity of moisture therefrom. The rich charcoal thus formed flows downwardly through desorption zone 79 subsequently into charcoal flow control valve 81 wherein it is engaged with the lift gas and raised through lift line 82 to impactless separator 83. Herein the suspension is broken and the separated charcoal settles into hopper 71.

The feed gas may in one modification be introduced by means of line 84 and passed through blower 85. The compressed air then may be divided into two streams, the first of which passes by means of line 86 controlled by valve 87 and is introduced by means of line 88 upwardly through bottom zone 80 into charcoal flow control valve 81. This valve may consist of a movable member 89 adapted to be raised and lowered by motive means 90 so that the lift gas introduced by means of line 88 may pass upwardly therethrough and so that a varying quantity of charcoal may be suspended depending on the position of movable means 89. The remaining quantity of compressed air is passed by means of line 91 controlled by valve 92 into manifold 93. Here again the gas may be divided into two streams, the first of which is introduced by means of line 94 controlled by valve 95 into primary feed gas engaging zone 75, and the second is passed by means of line 96 controlled by valve 97 into secondary feed gas engaging zone 78. Each fraction of feed gas thus introduced passes upwardly through the respective adsorption zone in direct countercurrent contact with the downwardly flowing charcoal. The humidity of the lean gas disengaged from the charcoal in primary lean gas disengaging zone 74 and secondary lean gas disengaging zone 77 depends upon the temperature of the charcoal and the ratio of the flows of charcoal and feed gas. These lean gases are removed by means of lines 98 and 99 controlled respectively by valves 100 and 101 and are combined in manifold 102. The lean dry gas is introduced by means of line 103 into separator 104 wherein suspended charcoal particles are separated. The charcoal particles are removed therefrom by means of line 102 controlled by valve 106 and the lean dry gas or dehumidified air is removed by means of line 107 and sent to the use for which it is intended, not shown.

Since the charcoal which has adsorbed moisture in primary adsorption zone 73 ultimately flows downwardly through secondary adsorption zone 72 in the modification zone in Figure 2, the quantity of moisture adsorbed in the latter adsorption zone will be less than the former for equal quantities of gas passed through each adsorption zone. Consequently, the humidity of the lean gas removed from secondary disengaging zone 77 may be somewhat higher than that removed from zone 74. It is therefore possible to obtain a wide range of operating conditions and product gas humidities by control of valves 95, 97, 100 and 101 so that proper blending of the dry gas produced will result in a product having the desired composition.

The rich or wet charcoal formed in the separation zone as above described passes downwardly into desorption zone 79 which is provided with means for heating the charcoal and which in small selective adsorption columns may be best provided by means of a coiled finned tube as indicated in Figure 2. The used of finned tubes is desirable since an efficient heat transfer between the heat transfer medium and the rich wet charcoal is thereby effected. Particularly is this true when the fins are formed on the tube as a spiral or as a series of discs quite closely spaced along the length of the tube so that the rich charcoal flows downwardly around the tubes and between the fins. The heating medium may comprise steam or hot water passed through the tubes or diluted flue gases may be employed. It is also possible to extend resistance coils through the tubes so that the heat may be produced electrically within desorption zone 79. By any of these aforementioned means the temperature of the rich or wet charcoal is increased to a temperature of between about 200° F. and about 500° F. or higher and a continuous downward flow of a portion of feed gas introduced into secondary engaging zone 78 is maintained through desorption zone 79 concurrently with the downwardly flowing charcoal. By this means a portion of the adsorbed moisture is desorbed and swept out of the desorption zone to be combined with the lift gas and raised to the upper portion of selective adsorption zone 70. The partially stripped charcoal settles into hopper 71 while the combined stripped gas and lift gas is removed from the upper portion of selective adsorption column 70 by means of line 108.

The partially stripped charcoal passes downwardly from hopper 71 through cooling zone 72 which may be adapted with finned tube coils similar to those employed in the adsorption zone previously described. The charcoal passes downwardly around the tubes and between the fins and is cooled by indirect heat exchange with a cooling medium such as cold water circulated through the tubes. A portion of the lean gas product normally removed from lean gas disengaging zone 74 is allowed to pass upwardly in direct contact with charcoal flowing downwardly through cooling zone 72 in order to strip remaining quantities of adsorbed moisture from the charcoal to form a cooled lean charcoal. The water vapor thus desorbed together with a small portion of lean gas is combined with the lift gas and stripped gas previously described in the upper portion of selective adsorption column 70 and the combined streams are removed by means of line 108 controlled by valve 109 and introduced into manifold 110. Proper adjustment of valves 100 and 109 permit the upward flow of a sufficient amount of lean gas through cooling zone 72 to effect desorption of the remaining quantities of adsorbed water vapor. These conditions are similar to those employed in regard to valves 87 and 97 and the bottom portion of selective adsorption column 70 for the control of a small amount of stripped gas passing downwardly through desorption zone 79. Similarly controlled conditions were described above in connection with Figure 1.

The combined gas stream introduced into manifold 110 may be removed by means of line 111 controlled by valve 112 and passed into separator 113 for the separation of suspended charcoal particles. These particles may be removed from separator 113 by means of line 114 controlled by valve 115. The combined gas, thus freed of suspended solids may be removed as a wet gas by means of line 16 and sent to storage or further processing, not shown, or vented to the atmosphere. In some cases it may be desirable to reprocess a portion of this gas in which case valve 112 is at least partially closed and valve 117 is at least partially opened so that a portion of the combined gas may be returned by means of line 118 and combined with the gas flowing through line 84, the inlet line of blower 85. It may also be desirable as previously described in connection with Figure 1 that the lift gas cycle and the feed gas streams be maintained substantially independent. In this case valve 92 is at least partially closed and the feed gas is introduced by means of line 119 controlled by valve 120 and passed by means of blower 121 into manifold 93 for introduction into the separation zone.

The apparatus just described in connection with Figure 2 is actually a modification of the apparatus shown in Figure 1 but which is particularly adapted to small scale sizes and constructions. Both described apparatuses have been found capable of effecting efficient separations of gaseous mixtures and in particular have been found to be well adapted to the separation of water vapor from various gases such as, for example, air. The conditions necessary for the dehumidification of air, for example, by the method and apparatus of this invention will be more clearly defined in connection with the following examples:

*Example I*

To illustrate the application of the process and apparatus of the present invention, conditions are herein described for the dehumidification of 300,000 cubic feet of air per hour, or 5,000 cubic feet per minute. The incoming air is at a temperature of 85° F. and a wet bulb temperature of 77° F. and a relative humidity of about 70%. The humid air thus contains slightly more than 2.8% moisture, by volume. It is desired to substantially completely dehumidify air at this rate and an apparatus similar to that shown in Figure 1 of the accompanying drawings is employed with the exception that a plurality of independent adsorption zones are used. This is done in order to decrease the diameter required for the selective adsorption column in dehumidifying this quantity of air. For example, if only one adsorption zone were employed a selective adsorption column having a diameter of about 12.5 feet is required in order that the gas velocity existing within the adsorption zone is not unduly high. By employing three adsorption zones each provided with a gas inlet and outlet and a charcoal inlet and outlet 300,000 cubic feet per hour of air may be dehumidified in a selective adsorption column having a diameter of 7 feet 3 inches. The total height of such a column is between about 95 feet and 100 feet. The activated charcoal circulation of about 1200 pounds per hour is employed for a charcoal-gas ratio of 40 pounds of charcoal per MSCF of air (1 MSCF is equal to 1,000 standard cubic feet), a lean gas or dry gas comprising dehumidified air is removed at a rate of 280,000 cubic feet per hour and has a dew point of $-80°$ F. The combined wet gas streams contain about $42\frac{1}{2}\%$ water vapor and are removed at a rate of about 20,000 cubic feet per hour. The charcoal is heated to a temperature of 300° F. in the desorption zone in order to effect a substantially complete desorption of adsorbed water vapor.

The air having a dew point of $-80°$ F. is substantially completely dry. By decreasing the charcoal-air ratio from 40 pounds per MSCF to lower values such as between about 10 and 20 pounds per MSCF dry air having humidities between 5% and 25% may be directly produced from the apparatus. If it is desirable that air streams having various moisture contents be produced, a large quantity of air may be substantially completely dehumidified, passed through line 43a and subsequently blended with a portion of the wet gas flowing through line 53a or with further quantities of atmospheric air flowing through line 35a to form air having the required relative humidity as indicated in Figure 1. One of the greatest advantages of producing dehumidified air directly from the selective adsorption column is that odors, suspended solids, gaseous irritants, etc., which are undesirable in air employed in air conditioning of buildings are completely removed forming a pure, clean and healthful atmosphere.

*Example II*

The process and apparatus of this invention may further be applied to the treatment of natural gas containing moisture to effectively eliminate the possibility of solid hydrocarbon-hydrate formation which has a detrimental effect on valves, pumps and piping employed in natural gas transportation. For the dehydration of natural gas charcoal-gas ratios of about 50 pounds per MSCF or less may be employed depending almost entirely upon the quantity of water vapor present in the gas and the pressure at which dehydration is to be effected. Increases in dehydration pressure markedly decrease the carbon-gas ratio required to effect dehydration but also simultaneously increase the temperature required to effect a desorption of adsorbed water vapor. For example, dehumidification of natural gas containing about 2% by volume of water vapor may be effected if desired at atmospheric pressure and employ a charcoal-gas ratio of about 45 pounds per MSCF. Stripping temperature of about 300° F. is adequate to desorb moisture from the carbon. By increasing the pressure of operation to about 100 pounds per square inch gauge, a charcoal-gas ratio of about 30 pounds per MSCF is adequate to substantially completely dehydrate the gas and a stripping temperature of about 400° F. is required to regenerate the carbon. Such an increase in pressure decreases the required cross sectional area of the selective adsorption column to about 20% of the area required for dehydration operations at atmospheric pressures. This obviously is a pronounced advantage of operation under pressure.

In the dehydration of natural gas an effect not noted in air dehydration is found in that in the adsorption zone or zones both water vapor and heavier hydrocarbon constituents such as butanes are simultaneously adsorbed to form a rich charcoal.

In the dehydration of 250,000 cubic feet of humid natural gas per hour a charcoal rate of 30 pounds per MSCF is employed involving a charcoal circulation rate of 7500 pounds per hour. A selective adsorption column similar to that employed in the apparatus of Example I in that it has three adsorption zones may be employed in the dehydration of natural gas. Such a column for the present example will have a diameter of about 3 feet 2 inches and will stand about 75 feet in height. The dew point of the natural gas product may be of the order of −120° F.

Marked reduction in the cross sectional area of the selective adsorption column employed in dehydration of such gases with an increase in operating pressure is readily observable by comparison of Examples I and II. Since air required for air conditioning purposes is not available generally at an elevated pressure Example I has been included as illustrative of atmospheric pressure operations and since natural gas containing water vapor is nearly always available in refineries at elevated pressures or must be compressed to elevated pressures for transmission, Example II has been included as illustrative of the more elevated pressures of operation. It is to be understood, however, that pressures considerably higher than those of Example II may be employed to some advantage as the present invention is not to be limited to the pressures shown in the two examples described.

Although the present invention has been described particularly in the separation of water vapor from air, the method and apparatus are obviously applicable also to the separation of water vapor from a wide variety of other gases without undue modification. Since water vapor in general is more readily adsorbable than other normally gaseous constituents, the process and apparatus of this invention are also applicable to the separation of gaseous mixtures which do not contain water vapor but which do contain a small proportion such as less than about 10% to 20% by volume of more readily adsorbable constituents. Such gaseous mixtures are exemplified by methane containing small quantities of propane, small quantities of methane in hydrogen, small quantities of nitrogen in helium and a number of other such gaseous mixtures.

This invention has been described as employing charcoal as the adsorbent which is used to effect the separation. Activated charcoal preferably granular of about 10 to 20 mesh in size and preferably prepared from coconut hulls or fruit pits comprises the preferred adsorbent. The term charcoal used in this description is, however, used broadly in that any animal, vegetable or mineral carbon having adsorbent properties may be employed. Furthermore, granules as large as about 4 mesh or as small as about 100 mesh or smaller may be employed if desired in specific instances. Granular adsorbents other than charcoal may be employed in the method and apparatus of this invention, such adsorbents including activated aluminum oxide, silica gel, activated bauxite, or other adsorbents prepared from metal oxides or metal hydroxides.

A modification in the apparatus of this invention and particularly with the modification described in connection with Figure 1 is possible in the replacements of the lift line shown with a system involving bucket elevators. Bucket elevators are very suitable in this service at low operation pressures, but are considerably more noisy and difficult to maintain at higher operation pressures and the gas lift line shown and described is preferable.

The method and apparatus of this invention is adapted to effect separations of gaseous mixtures of pressures of from atmospheric or somewhat below to as high as 1,000 pounds per square inch or higher. Operations for effecting the dehumidification of air are very effectively accomplished at between atmospheric or about 150 pounds per square inch. The dehydration of natural gas, for example, may conveniently be carried out at pressures of 50 and 250 pounds per square inch or even as low as atmospheric pressures.

Having described and illustrated my invention and realizing that many modifications may be made by those skilled in the art without departing from the spirit and scope of the following claims, I claim:

1. A method for the separation of a gaseous mixture which comprises passing a solid granular adsorbent downwardly successively through an adsorption zone and a desorption zone as a moving bed, introducing said gaseous mixture into contact with said adsorbent whereby a first portion passes countercurrently through said adsorption zone wherein the more readily adsorbable constituents are adsorbed to form a rich adsorbent and leaving less readily adsorbable constituents as a substantially unadsorbed lean gas and a second portion passes concurrently with said rich adsorbent through said desorption zone, subjecting said rich adsorbent therein to indirect heating while directly contacting the thus heated rich adsorbent concurrently with said second portion of said gaseous mixture in the absence of other stripping gases thereby desorbing more readily adsorbable constituents to form a rich gas and a partially stripped adsorbent, subsequently indirectly cooling said partially stripped adsorbent in a cooling zone while contacting it with a portion of said lean gas to form a lean adsorbent, and returning said lean adsorbent to said adsorption zone.

2. A method according to claim 1 wherein said more readily adsorbable constituent in said gaseous mixture comprises water vapor.

3. A method according to claim 1 wherein said gaseous mixture comprises natural petroleum gas containing water vapor.

4. A method according to claim 1 wherein said gaseous mixture comprises air containing water vapor.

5. A method according to claim 1 wherein said solid granular adsorbent comprises activated charcoal.

6. A method for the dehumidification of air to effect conditioning thereof which comprises passing a moving bed of activated charcoal downwardly through an adsorption zone and a desorption zone, introducing said air into contact with said bed of charcoal whereby a portion of said air passes upwardly through said adsorption zone and the remaining portion passes concurrently with the charcoal downwardly through said desorption zone, removing a portion of dehumidified air from said adsorption zone, controlling the rate of flow of air into said adsorption zone in accordance with the temperature of said adsorbent therein to maintain a predetermined humidity of said dehumidified air, heating said adsorbent in said desorption zone indirectly while stripping the heated adsorbent therein with said remaining portion of air to desorb adsorbed water vapor leaving a hot charcoal, removing the thus desorbed water vapor from said desorption zone, indirectly cooling said hot charcoal in a cooling zone while countercurrently contacting it with the remaining portion of said dehumidified air forming a cool charcoal and returning said cool charcoal for repassage through said adsorption and desorption zones.

7. A method for the dehumidification of humid air which comprises introducing said humid air into contact with a moving bed of activated charcoal whereby a first portion of said air passes countercurrently through an adsorption zone thereby adsorbing at least a portion of the water vapor contained therein leaving dehumidified air substantially unadsorbed and forming a rich charcoal warmed by the liberated heat of adsorption and a second portion passes concurrently with said rich charcoal through a desorption zone, cooling the thus warmed charcoal in said adsorption zone, removing a portion of said dehumidified air from said adsorption zone, passing said rich charcoal to said desorption zone, heating said rich charcoal by indirect heat exchange in said desorption zone while concurrently stripping the thus heated charcoal throughout said desorption zone with said second portion of said humid air as the stripping agent to desorb the adsorbed water vapor as a rich gas and leaving a hot partially stripped charcoal, passing said partially stripped charcoal suspended in a lift gas from said desorption zone to a cooling zone, cooling said partially stripped charcoal by indirect heat exchange while countercurrently contacting said partially stripped charcoal as a compact moving bed with the remaining portion of said dehumidified air to form a cool lean charcoal and returning said lean charcoal to said adsorption zone.

8. A method according to claim 7 wherein a pressure of between less than about atmospheric pressure and as high as about 1000 pounds per square inch is maintained in said adsorption zone.

9. A process for the separation of a gaseous mixture which comprises establishing a cooling zone, an adsorption zone and a desorption zone, passing a moving bed of compact solid granular adsorbent downwardly successively through said zones, recirculating adsorbent removed from said desorption zone to said cooling zone by suspension in a recirculating gas stream, passing a gaseous mixture to be separated into contact with said adsorbent whereby a first portion of said gaseous mixture flows countercurrently to said adsorbent in said adsorption zone forming a rich adsorbent containing the more readily adsorbable constituents leaving a substantially unadsorbed lean gas and a second portion of said gaseous mixture passes concurrently with said rich adsorbent through said desorption zone, controlling the rate of flow of said gaseous mixture introduced into said adsorption zone in accordance with the temperature of the adsorbent therein to maintain a predetermined concentration of more readily adsorbable constituents in said lean gas, removing said lean gas from said adsorption zone, indirectly heating said rich adsorbent in said desorption zone while stripping the heated adsorbent therein with said second portion of said gaseous mixture to desorb a rich gas product containing said more readily adsorbable constituents leaving a hot partially stripped adsorbent, subsequently stripping said partially stripped adsorbent in said cooling zone with a portion of said lean gas to desorb residual quantities of said more readily adsorbable constituents from said adsorbent while indirectly cooling said adsorbent forming a cool lean adsorbent and passing said cool lean adsorbent into said adsorption zone to contact further quantities of said gaseous mixture.

10. A process according to claim 9 wherein the concentration of more readily adsorbable constituents in a gas product containing said unadsorbed lean gas is maintained at a predetermined value by controlling the ratio of the flow of said adsorbent to the flow of said gaseous mixture through said adsorption zone so as to adsorb a desired amount of said more readily adsorbable constituents from said gaseous mixture.

11. A process according to claim 9 wherein said adsorption zone comprises a plurality of adsorption zones together with the steps of passing said adsorbent successively through said adsorption zones, introducing an individual stream of said gaseous mixture into each of said adsorption zones, removing from said plurality of adsorption zones a plurality of unadsorbed streams of gas each having a different composition and blending said plurality of unadsorbed lean gases to form a lean gas product of a predetermined composition.

12. A method for the dehumidification of a humid gas which comprises introducing a humid gas into contact with a downwardly moving bed of adsorbent whereby a first portion of said humid gas passes countercurrent to a moving bed of solid granular adsorbent in an adsorption zone to adsorb at least a portion of the moisture therefrom forming a rich adsorbent and leaving a substantially unadsorbed at least partially dehumidified lean gas and a second portion of said humid gas passes concurrently with said rich adsorbent through a desorption zone, removing said lean gas from said adsorption zone, heating said rich adsorbent by indirect heat exchange in said desorption zone while simultaneously stripping the thus heated rich adsorbent with said second portion of said humid gas as a stripping agent thereby forming a partially stripped adsorbent and a desorbed rich gas product, subsequently indirectly cooling said partially stripped adsorbent in a cooling zone, directly contacting the adsorbent while cooling with a portion of said unadsorbed lean gas forming a cool lean adsorbent, employing said cool lean adsorbent to contact further quantities of said humid gases and blending at least a portion of said substantially unadsorbed lean gas with at least a portion of said rich gas to provide a gaseous mixture having a predetermined humidity.

13. A method for the dehumidification of a humid gas which comprises introducing said humid gas into contact with a moving bed of solid granular adsorbent whereby a first portion passes countercurrent thereto to adsorb at least a portion of the moisture therefrom in an adsorption zone forming a rich adsorbent and leaving a substantially unadsorbed and at least partially dehumidified lean gas and a second portion passes concurrently with said rich adsorbent through a desorption zone, separating said unadsorbed gas, subsequently heating said rich adsorbent in said desorption zone by indirect heat exchange while simultaneously stripping the thus heated rich adsorbent with said second portion of said humid gas as a stripping agent forming a partially stripped adsorbent and a desorbed rich gas, subsequently indirectly cooling said partially stripped adsorbent in a cooling zone while directly contacting the cooling adsorbent with a portion of said lean gas forming a cool lean adsorbent and a wet gas stream, employing said cool lean adsorbent to contact further quantities of said humid gas and blending at least part of said wet gas stream with at least part of said lean gas to produce a gaseous mixture having a predetermined humidity.

14. A method for the dehumidification of a humid gas which comprises introducing said humid gas into contact with a moving bed of solid granular adsorbent whereby a first portion of said humid gas passes countercurrent thereto to adsorb a least a portion of the moisture therefrom in an adsorption zone forming a rich adsorbent and leaving a substantially unadsorbed at least partially dehumidified lean gas and a second portion passes concurrently with said rich adsorbent through a desorption zone, separating said unadsorbed lean gas, heating said rich adsorbent by indirect heat exchange while simultaneously stripping the thus heated rich adsorbent with said second portion of said humid gas as a stripping agent in said desorption zone forming a partially stripped adsorbent and a desorbed rich gas product, indirectly cooling said partially stripped adsorbent while directly contacting the cooling adsorbent with a portion of said lean gas in a cooling zone forming a wet gas stream, employing the cool lean adsorbent to contact further quantities of said humid gas, combining at least part of said wet gas stream with at least part of said desorbed rich gas stream forming a combined wet gas stream and blending at least part of said combined wet gas stream with at least part of said unadsorbed lean gas to produce a gaseous mixture having a predetermined humidity.

15. A process for the separation of a gaseous mixture which comprises establishing a cooling zone, a plurality of adsorption zones and a desorption zone, passing a moving bed of compact solid granular adsorbent downwardly through said zones, recirculating adsorbent removed from said desorption zone to said cooling zone, passing a portion of a gaseous mixture to be separated into contact with said adsorbent whereby first portions of said gaseous mixture pass upwardly through each of said plurality of adsorption zones forming a rich adsorbent containing the more readily adsorbable constituents leaving a plurality of substantially unadsorbed lean gas streams and a second portion of said gaseous mixture passes concurrently with said rich adsorbent into said desorption zone, indirectly heating said rich adsorbent therein while stripping the heated rich adsorbent therein with said second portion of said gaseous mixture to desorb a rich gas product containing said more readily adsorbable constituents leaving a hot partially stripped adsorbent, subsequently stripping said partially stripped adsorbent in said cooling zone with a portion of said lean gas while indirectly cooling said adsorbent therein to desorb residual quantities of said more readily adsorbable constituents forming a cool lean adsorbent, passing said cool lean adsorbent into said adsorption zone to contact further quantities of said gaseous mixture, removing a plurality of unadsorbed streams of lean gas each having a different composition from said plurality of adsorption zones and blending said plurality of lean gases to form a lean gas product of a predetermined composition.

16. An apparatus for the continuous separation of a gaseous mixture by selective adsorption on a solid granular adsorbent which comprises a selective adsorption column provided with an indirect cooling zone, a separation zone and a desorption zone, means for maintaining a continuous recirculation of solid granular adsorbent from the bottom to the top of said column and downwardly therethrough as a moving bed through said zones, means for introducing said gaseous mixture into the bottom of said separation zone, means for removing a lean gas from the top of said separation zone, means for forcing at least part of said lean gas directly from said adsorption zone through said cooling zone, means for subjecting a rich adsorbent to indirect heating in said desorption zone while concurrently stripping the thus heated adsorbent with a second portion of said gaseous mixture as a stripping gas passed entirely through said desorption zone to desorb adsorbed more readily adsorbable constituents leaving a hot partially stripped adsorbent, outlet means for removing the thus desorbed rich gas, separate means associated with said outlet means for lean gas and with an outlet means rich gas for flowing a first portion of said gaseous mixture upwardly through said separation zone and said second portion thereof downwardly through said desorption zone and means in said cooling zone for subjecting said hot partially stripped adsorbent to indirect heat exchange while contacting the cooling adsorbent with said portion of said lean gas forming a cooled lean adsorbent prior to returning said adsorbent to said separation zone.

17. An apparatus according to claim 16 wherein said separation zone comprises at least one adsorption zone each provided with a gas engaging zone and a lean gas disengaging zone.

18. An apparatus for the continuous separation of a gaseous mixture which comprises a selective adsorption column provided at successively lower levels therein with a cooling zone, a plurality of adsorption zones and a desorption zone, a lift line positioned within said adsorption column adapted to carry adsorbent suspended in a lift gas from the bottom to the top of said adsorption column, means for introducing a portion of said gaseous mixture into each of said adsorption zones, means for dissipating heat of adsorption liberated therein, means for removing a plurality of streams of substantially unadsorbed gas from said adsorption zones, means for blending the said plurality of streams in various proportions to control the composition of the unadsorbed gas product, means for introducing the remaining portion of said gaseous mixture into said lift line, means for indirectly heating adsorbent in said desorption zone, means for concurrently contacting said heated adsorbent in said desorption zone with a portion of gaseous mixture introduced into said adsorption zone, means for combining constituents desorbed from said adsorbent in said desorption zone with said portion of gaseous mixture introduced into said lift line and means for removing desorbed constituents and lift gas from said adsorption column.

19. An apparatus according to claim 18 wherein said means for heating said adsorbent in said desorption zone and for cooling said adsorbent in said adsorption zone comprises a coiled finned tube so positioned that the compact moving bed of adsorbent flows downwardly around the coiled tube and between the fins of said tube.

20. An apparatus for the continuous dehumidification of air by selective adsorption on granular charcoal which comprises a vertical selective adsorption column provided with a lift line positioned along the vertical axis of said column, inlet means to the bottom of said lift line adapted to the introduction of a granular adsorbent and a lift gas to form a suspension, impactless separator means at the top of said lift line in the top of said column adapted to separate suspended adsorbent from said lift gas, said selective adsorption column being further provided with a cooling zone containing a coiled finned tube heat transfer means adapted to indirectly cool said adsorbent, a separation zone positioned below said cooling zone and containing at least one adsorption zone, means for introducing a stream of air into each of said adsorption zones, means for cooling said adsorbent in each of said adsorption zones, means for removing a stream of dehumidified air from each of said adsorption zones, means for passing a portion of said dehumidified air product through said cooling zone to strip residual moisture therefrom and form a lean cool adsorbent, means for blending the streams of said dehumidified air from each of said adsorption zones in various proportions to control the humidity of said dehumidified air product, said adsorption column being further provided with a desorption zone containing a coiled finned tube heat transfer means adapted to indirectly heat said adsorbent, means for concurrently contacting the thus heated adsorbent with a portion of said gaseous mixture to be separated thereby desorbing at least a portion of the adsorbed constituents from said adsorbent, means at the bottom of said lift line for combining said desorbed constituents with said lift gas and means at the top of said adsorption column for removing said lift gas and said desorbed constituents.

21. An apparatus according to claim 20 wherein said lift line is provided with a lower inlet opening within and positioned adjacent to the bottom of said adsorption column, a movable member adjustable in position with respect to said inlet opening and motive means for moving said movable member whereby said granular adsorbent is introduced uniformly around the periphery of said inlet means and conveyed uniformly through said lift line to control the rate of circulation of said granular adsorbent through said adsorption column.

CLYDE H. O. BERG.

References Cited in the file of this patent

UNITED STATES PATENTS

| Number | Name | Date |
| --- | --- | --- |
| 1,422,007 | Soddy | July 4, 1922 |
| 1,522,480 | Allen | Jan. 13, 1925 |
| 1,825,707 | Wagner, Jr. | Oct. 6, 1931 |
| 1,836,301 | Bechthold | Dec. 15, 1931 |
| 2,527,964 | Robinson | Oct. 31, 1950 |
| 2,549,104 | Lechthaler | Apr. 17, 1951 |

OTHER REFERENCES

"Adsorption" by C. L. Mantell; McGraw-Hill Book Co., 1945; page 164.